United States Patent [19]

Osato

[11] Patent Number: 5,163,031
[45] Date of Patent: Nov. 10, 1992

[54] METHOD OF RECORDING TETRA-VALUE SIGNAL ON MAGNETO-OPTICAL RECORDING MEDIUM WITH PLURAL MAGNETIC LAYERS

[75] Inventor: Yoichi Osato, Yokohama, Japan

[73] Assignee: Canon Kabushiki Kaisha, Tokyo, Japan

[21] Appl. No.: 446,416

[22] Filed: Dec. 5, 1989

[30] Foreign Application Priority Data

Dec. 7, 1988 [JP] Japan .................. 63-307869
Dec. 7, 1988 [JP] Japan .................. 63-307870
Nov. 29, 1989 [JP] Japan .................. 1-307553
Nov. 29, 1989 [JP] Japan .................. 1-307554

[51] Int. Cl.⁵ .............. G11B 13/04; G11B 11/12; G11B 11/10
[52] U.S. Cl. ................... 369/13; 360/59; 360/114
[58] Field of Search ......... 369/13, 116, 121, 122, 369/124, 54, 59; 360/59, 114; 365/122

[56] References Cited

U.S. PATENT DOCUMENTS 4,612,587 9/1986 Kaneko et al. ................. 369/13
4,805,043 2/1989 Doyle ........................... 360/59
4,938,915 7/1990 Saito ............................ 369/13

FOREIGN PATENT DOCUMENTS 57-78653 5/1982 Japan ............................ 360/59

Primary Examiner—Hoa Nguyen
Attorney, Agent, or Firm—Fitzpatrick, Cella, Harper & Scinto

[57] ABSTRACT

A method for recording a signal on a magneto-optical recording medium comprising a first magnetic layer exhibiting a vertical magnetic anisotropy and a second magnetic layer exchange-coupled to the first magnetic layer and having a higher Curie point and a lower coercive force at a room temperature than those of the first magnetic layer, exchange forces acting on the first and second magnetic layers being lower than the coercive force of the second magnetic layer by applying to the medium a biasing magnetic field having polarity and magnitude thereof modulated in predetermined states depending on the signal while a light beam having a power to heat the medium to the vicinity of the Curie point of the first magnetic layer is irradiated to the medium.

7 Claims, 6 Drawing Sheets

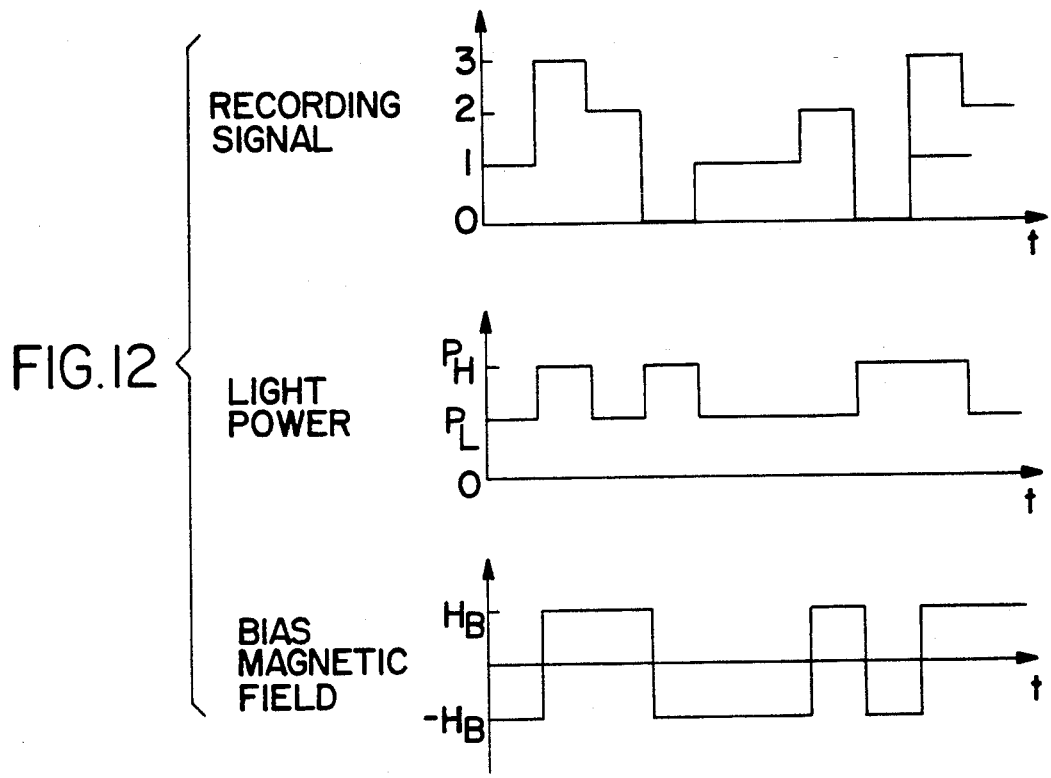
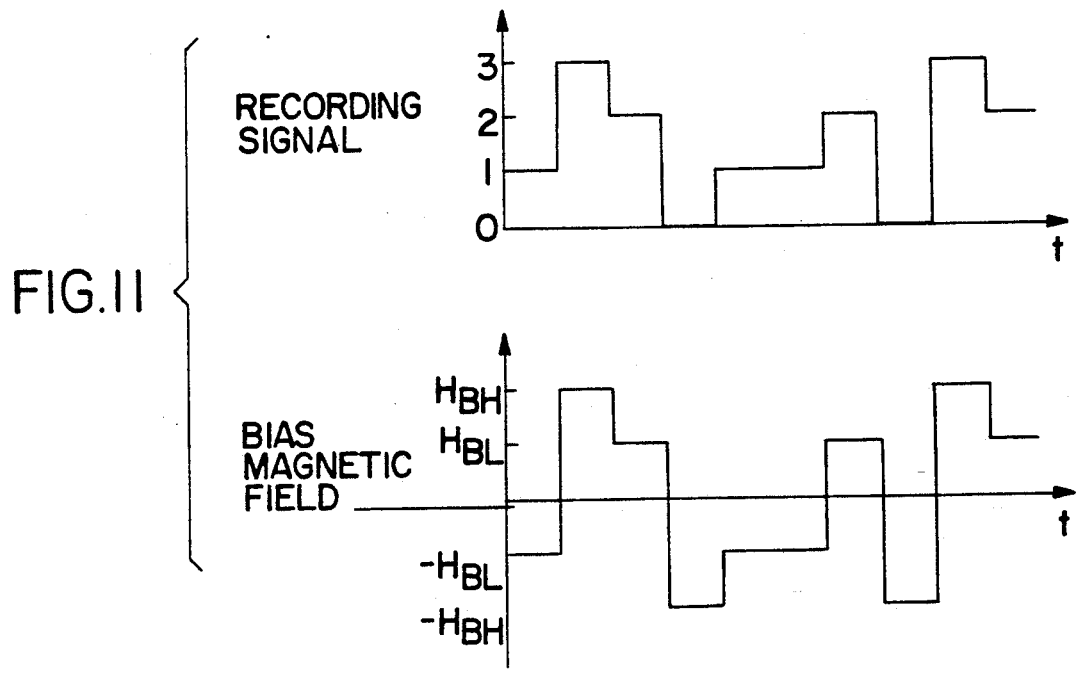

METHOD OF RECORDING TETRA-VALUE SIGNAL ON MAGNETO-OPTICAL RECORDING MEDIUM WITH PLURAL MAGNETIC LAYERS

BACKGROUND OF THE INVENTION

1. Field of the Invention

The present invention relates to a method for recording a signal by applying a biasing magnetic field to a magneto-optical recording medium while a light beam (such as a laser beam) is irradiated to the medium.

2. Related Background Art

An optical memory which records or reproduces using a light beam has recently been developed for use as a high density and large capacity memory. Magneto-optical recording medium has also been attracting interest for use as a rewritable optical memory. In such a magneto-optical medium, a signal is recorded by orienting directions of magnetization of a magnetic layer of the medium along a predetermined direction, and irradiating a light beam which is intensity modulated in accordance with a record signal while a biasing magnetic field is applied to the medium in the opposite direction to the predetermined direction. The signal is reproduced by irradiating a polarized beam to the medium and observing the change of direction of polarization by a magneto-optical effect.

However, in the above recording method, it is necessary to orient the directions of magnetization of the magnetic layer, that is, erase the previously recorded signals before a signal can be rewritten. On the other hand, in Japanese Laid-Open patent application No. 51-107121, a biasing magnetic field whose polarity is reversed in accordance with a signal is applied while a light beam of a constant intensity is irradiated to the medium so that the overwriting is attained without the erase step. EPO Laid-Open patent No. 258,978 (corresponding to → U.S. patent application Ser. No. 475,941) and West Germany Laid-Open Pat. No. 3,619,618 disclose overwriting by irradiating an intensity-modulated light beam to a magneto-optical recording medium having two exchange-coupled magnetic layers.

On information other hand, recording density and the speed are limited if information (representing each record bit) is a binary signal representing an upward or downward direction of magnetization of the magneto-optical recording film, because the recording density of the currently available magneto-optical recording medium is essentially determined by a wavelength of a semiconductor laser used for recording the signal (approximately 800 nm). For example, to double the recording density, requires a semiconductor laser having a wavelength of approximately $800/\sqrt{2}=570$ nm which is not currently available is distant.

However, if the record bit recorded on the magnetic layer can have one of tetra values, the recording density is doubled. If the tetra-value signal is recorded and reproduced at the same speed as that for a conventional binary signal, the recording/reproducing speed is also doubled. A tetra-value recording method is disclosed in U.S. Pat. No. 4,612,587 wherein a signal is recorded by irradiating two light beams having different wavelengths and independently intensity-modulated are irradiated to a magneto-optical recording medium having two magnetic layers having different absorbing wavelengths.

However, U.S. Pat. No. 4,612,587, the directions of magnetization of the two magnetic layers must be oriented before the signal is recorded, and the overwriting is not attained. Further, the two light beams which are used require two light sources so that the recording apparatus is complex in construction and expensive.

SUMMARY OF THE INVENTION

It is an object of the present invention to provide a magneto-optical recording method which solves the problems encountered in the prior art method, uses a simple and inexpensive recording apparatus and permits the overwriting of tetra-value signals.

The above object of the present invention is achieved by a method for recording a signal on a magneto-optical recording medium comprising a first magnetic layer exhibiting a vertical magnetic anisotropy and a second magnetic layer exchange-coupled to the first magnetic layer and having a higher Curie point and a lower coercive force at a room temperature then those of the first magnetic layer, exchange forces acting on the first and second magnetic layers being lower than the coercive force of the second magnetic layer, said method comprising the step of:

applying to the medium a biasing magnetic field having polarity and magnitude thereof modulated in the following four states depending on the signal, while a light beam having a power to heat the medium to the vicinity of the Curie point of the first magnetic layer is irradiated to the medium;

(a) a first state wherein the biasing magnetic field orients the magnetization of the second magnetic layer along a predetermined direction and orients the magnetization of the first magnetic layer along a direction stable to the magnetization of the second magnetic layer, (b) a second state wherein the biasing magnetic field orients the magnetizations of both the first magnetic layer and the second magnetic layer along the predetermined direction, (c) a third state wherein the biasing magnetic field orients the magnetization of the second magnetic layer along the opposite direction to the predetermined direction and orients the magnetization of the first magnetic layer along a direction stable to the magnetization of the second magnetic layer, and (d) a fourth state wherein the biasing magnetic field orients the magnetizations of both the first magnetic layer and the second magnetic layer along the opposite direction to the predetermined direction.

In other embodiment of the present invention, the above object is achieved by a method for recording a signal on a magneto-optical recording medium comprising a first magnetic layer exhibiting a vertical magnetic anisotropy and a second magnetic layer exchange-coupled to the first magnetic layer and having a higher Curie point and a lower coercive force at a room temperature than those of the first magnetic layer, exchange forces acting on the first and second magnetic layers being lower than the coercive force of the second magnetic layer, said method comprising the step of:

applying to the medium a biasing magnetic field while a light beam is irradiated to the medium, with a power of the light beam and a polarity of the biasing magnetic field being modulated in the following four states depending on the signal;

(a) a first state wherein the light beam has a power to heat the medium to the vicinity of the Curie point of the first magnetic layer, (b) a second state wherein the light beam has a power to heat the medium to the vicinity of the Curie point of the second magnetic layer and the biasing magnetic field has a predetermined polarity, (c) a third state wherein the light beam has the power to heat the medium to the vicinity of the Curie point of the first magnetic layer and the biasing magnetic field has the opposite polarity to the predetermined polarity, and (d) a fourth state wherein the light beam has the power to heat the medium to the vicinity of the Curie point of the second magnetic layer and the biasing magnetic field has the opposite polarity to the predetermined polarity.

BRIEF DESCRIPTION OF THE DRAWINGS

FIGS. 11 and 12 show signals applied in order to record in accordance with preferred embodiments of the present invention.

DETAILED DESCRIPTION OF THE PREFERRED EMBODIMENTS

Figure 1A:
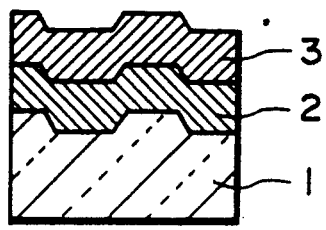
FIGS. 1A and 1B show schematic sectional views of a magneto-optical recording medium used in the present method.

FIG. 1A shows a sectional view of a magneto-optical recording medium used in the recording method of the present invention. In FIG. 1, a first magnetic layer 2 and a second magnetic layer 3 are laminated on a transparent substrate 1 having pregrooves formed therein. The first magnetic layer 2 has a low Curie point ($T_L$) and a high coercive force ($H_H$), and the second magnetic layer 3 has a high Curie point ($T_H$) and a low coercive force ($H_L$) The terms "high" and "low" herein used show relative relations in the comparison of both layers. (The coercive forces are compared at a room temperature). Usually, it is preferable that $T_L$ of the first magnetic layer 2 is 70–180° C. and $H_H$ is 3–20 KOe, and $T_H$ of the second magnetic layer 3 is 100–400° C. and $H_L$ is 0.1–2 KOe.

The materials of the magnetic layers may be those which exhibit a vertical magnetic anisotropy and a magneto-optical effect, and preferably they are amorphous magnetic alloy of a rare earth element and a transition metal element such as GdCo, GdFe, TbFe, DyFe, GdTbFe, TbDyFe, GdFeCo, TbFeCo, GdTbCo, GdDyFeCo, TbDyFeCo, HoGd or FeCo.

In the magneto-optical recording medium used in the present invention, the first magnetic layer and the second magnetic layer are coupled by exchange coupling. Those magnetic layers meet the following relationship $$H_H > H_L > \frac{\sigma w}{2 M_{s2} h_2}$$

where $H_H$ is the coercive force of the first magnetic layer at a room temperature, $H_L$ is the coercive force of the second magnetic layer at the room temperature, $M_{s2}$ is a saturation magnetization of the second magnetic layer, $h_2$ is a thickness of the second magnetic layer, and $\sigma w$ is a magnetic wall energy between the two layers.

$$\frac{\sigma w}{2 M_{s2} h_2}$$

represents an exchange force to orient the second magnetic layer 3 along a direction which is stable to the first magnetic layer 2. This relationship assures that the magnetization of the bit finally formed by the recording process remains stably. When the above relationship is met, it means that the exchange forces acting on the first magnetic layer and the second magnetic layer are smaller than the coercive forces of the respective magnetic layers at the room temperature.

In order for those magnetic layers to have the above characteristics, it is effective to provide a magnetic layer having a large Ms (that is, a small coercive force) between the first magnetic layer and the second magnetic layer.

In the exchange-coupled two magnetic layers, the exchange force acts to orient the directions of magnetization of the two layers along the same direction (parallel) at one time, and orient them along the opposite directions (anti-parallel) at the other time, depending on compositions of the respective magnetic layers. The recording method of the present invention is applicable whichever direction the magnetizations of the medium are oriented.

Figure 1B:
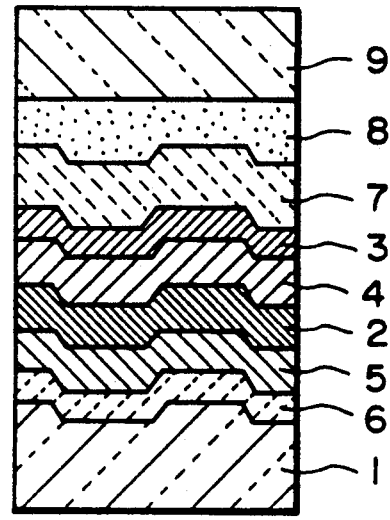

FIG. 1B shows other example of the magneto-optical recording medium used in the present method. In FIG. 1B, the like members to those shown in FIG. 1A are designated by the like numerals and the explanation thereof is omitted. In the present example, a third magnetic layer 4 is provided between the first magnetic layer 2 and the second magnetic layer 3 to adjust the exchange force between the first layer and the second layer. Further, a fourth magnetic layer 5 which exhibits a larger magneto-optical effect than that of the first magnetic layer (that is, has a higher Curie point) is provided adjacently to the first magnetic layer 2. The first and fourth magnetic layers are coupled by a strong exchange force so that the magnetizations of those layers are always oriented in a stable direction. By providing the fourth magnetic layer 5, a higher C/N ratio is attained in the reproduction of the signal.

Protective layers 6 and 7 made of a dielectric material such as Si3N4 are provided at the top and the bottom of the four magnetic layers in order to prevent the erosion of the magnetic layers. A connecting substrate 9 made of the same material as that of the substrate 1 is bonded to the protective layer 7 by a bonding layer 8. The layers 2 to 7 are laminated on the connecting substrate 9 to attain recording function and reproducing function by the front side and the rear side of the assembly.

When those magnetic layers are formed by a rare earth-transition metal amorphous alloy, the films are usually formed by sputtering or electron beam vapor deposition. The saturation magnetization and the coercive force of the magnetic film may be adjusted by changing the composition of the rare earth element and the transition metal element of the film. For example, a target primarily including the rare earth element (vaporization source) and a target primarily including the transition metal element are simultaneously sputtered is a sputtering apparatus, and the composition of the film formed is controlled by adjusting the sputtering speeds of those targets.

The protective layers are also frequently formed by sputtering or electron beam vapor deposition.

The magneto-optical recording medium described above is explained in detail in the EP Pat. No. 258,978 mentioned above. In the present invention, the same medium as that used in the conventional binary signal overwriting may be used.

Figure 2:
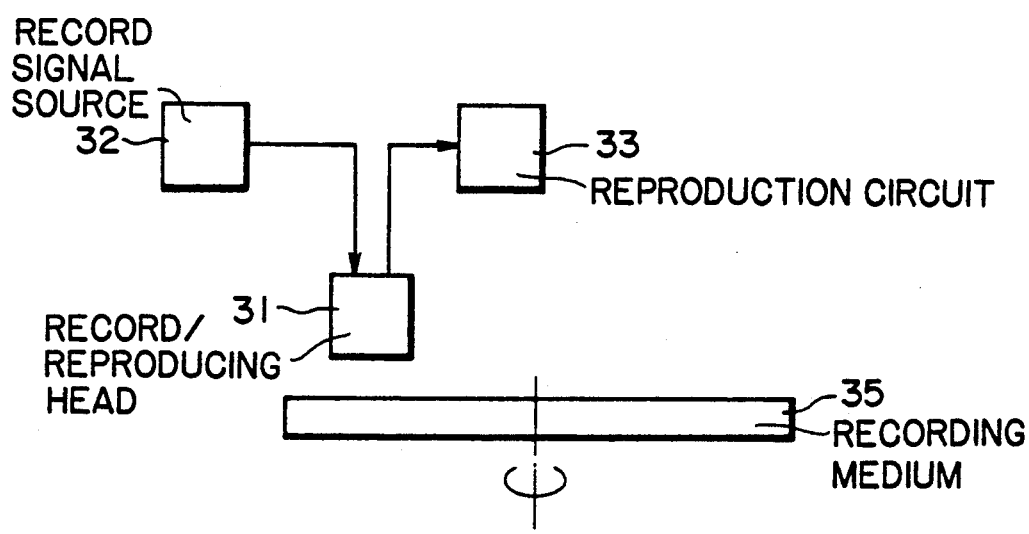
FIG. 2 shows a schematic view of a magneto-optical recording and reproducing apparatus used in the present method.

FIG. 2 shows an example of a magneto-optical recording and reproducing apparatus which embodies the present recording method. In FIG. 2, numeral 35 denotes a disk-like magneto-optical recording medium having the structure described above. The medium 35 is rotated by a motor (not shown) and information is recorded and reproduced by a recording/reproducing head 31, which comprises a light source such as a semiconductor laser for generating a light beam to be irradiated to the medium, and biasing magnetic field application means such as an electromagnet. The recording/reproducing head 31 is driven by a record signal supplied from a record signal source 32. The recording/reproducing head 31 has an analyzer and a photo-detector. A reflected light from the medium 35 of the light beam of a fixed intensity irradiated in the reproduction mode is directed to the photo-detector through the analyzer and the output from the photo-detector is supplied to a reproduction circuit 33 to reproduce the record signal. A principle of the signal reproduction is same as that in the U.S. Pat. No. 4,612,587 mentioned above.

Figure 3:
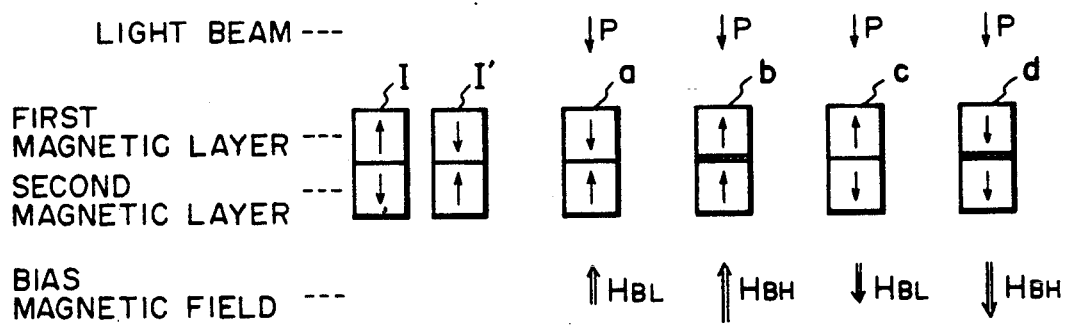
FIG. 3 illustrates a recording method in accordance with one embodiment of the present invention.

FIG. 3 illustrates the recording method in accordance with one embodiment of the present invention. In FIG. 3, a rectangular frame shows an upper first magnetic layer and a lower second magnetic layer, and arrows in the frame show the directions of magnetization of the magnetic layers in the respective record states. An arrow below the frame shows a polarity and a magnitude of a biasing magnetic field applied to the medium. In the present embodiment, the medium in which the exchange force acts to orient the magnetizations anti-parallelly is used.

In the present embodiment, the biasing magnetic field modulated in four states $+H_{BL}$, $+H_{BH}$, $-H_{BL}$ and $-H_{BH}$ is applied to the medium 35 by the biasing magnetic field application means in the recording/reproducing head 31 in accordance with the tetra-value signal supplied from the signal source 32 of FIG. 2. The signs represent the polarities of the biasing magnetic field, plus (+) represents upward, and minus (−) represents downward. The light beam irradiated to the medium 35 is not modulated and the power P is set to a level to heat the medium to the Curie point of the first magnetic layer.

In FIG. 3, the magnetization status prior to the recording may be either I or I'. The biasing magnetic field $+H_{BL}$ is applied while the light beam having the power P is irradiated to the medium as shown by a. Thus, the first magnetic layer 2 is heated up to the vicinity of its Curie point but the second magnetic layer 3 has a coercive force which assures the bits remain stably at this temperature. The magnetization of the first magnetic layer 2 receives a force (exchange force) to orient its magnetization along a direction stable to the magnetization of the second magnetic layer 3 (that is, anti-parallel). The exchange force is normally in the order of 0.1–2 KOe.

When the biasing magnetic field is at a level $H_{BL}$ which does not present the first magnetic layer 2 from being oriented anti-parallelly to the magnetization of the second magnetic layer 3, that is, to approximately 0.1–0.5 KOe and smaller than the exchange force, the bits a are formed in any of the states I and I' shown in FIG. 3.

Figure 4:
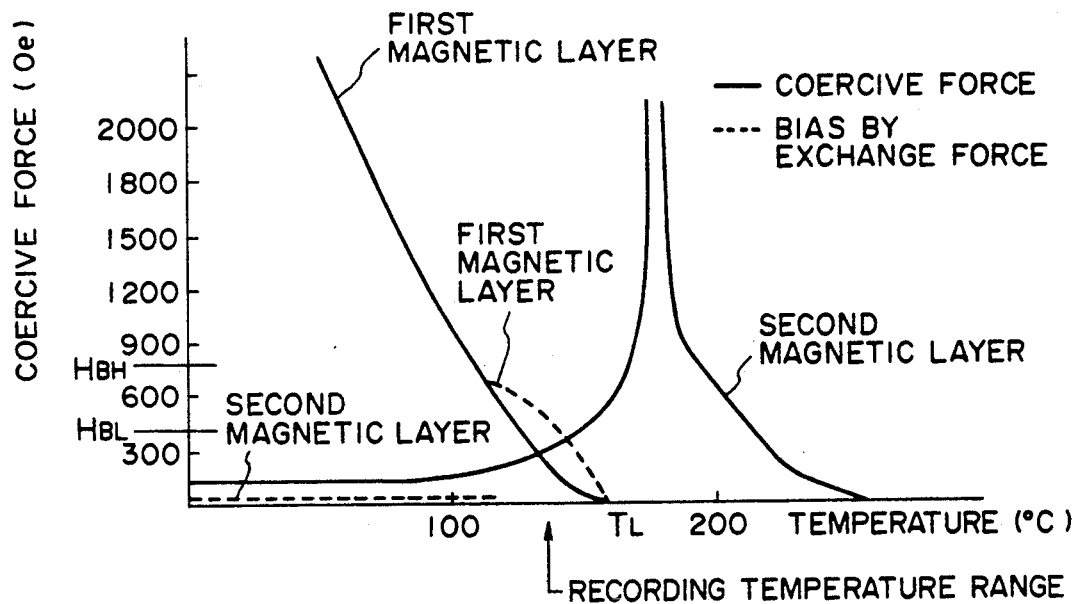
FIG. 4 shows a graph of a temperature characteristic of a coercive force of a magnetic layer used in the method of FIG. 3.

When the biasing magnetic field is at a level $H_{BH}$ which presents the first magnetic layer 2 from being oriented anti-parallelly to the magnetization of the second magnetic layer 3 (that is, which orients parallelly), that is, to approximately 0.3–1 KOe and greater than the exchange force, the bits b are formed in any of the states I and I' shown in FIG. 3. FIG. 4 shows temperature dependency of the coercive forces of the first and second magnetic layers, the exchange forces acting on the first and second magnetic layers, and the biasing magnetic fields $H_{BL}$ and $H_{BH}$.

In FIG. 3, when the biasing magnetic field $H_{BL}$ is applied downward and the laser having the power P is irradiated, the bits are formed in any of the states I and I'.

In FIG. 3, when the biasing magnetic field $H_{BH}$ is applied downward and the laser having the power P is irradiated, the bits d are formed in any of the states I and I'.

Since the record bit states a, b, c and d do not depend on the recorded states, the overwriting is attained.

In the magneto-optical recording medium used in the above embodiment, the magnetizations are astable when the magnetizations of the first and second magnetic layers are anti-parallel. Where the magnetic layers are made of a rare earth-transition metal amorphous alloy, the above requirement is met if the compositions of the magnetic layers are adjusted such that one of the two layers exhibits preferential magnetization of rare earth sub-lattice (so-called riched in rare earth) and the other layer exhibits preferential magnetization of transition metal sub-lattice (so-called riched in transition metal).

EXAMPLE 1

On a polycarbonate disk substrate having pregrooved and preformatted signals recorded thereon, a protective layer $Si_3N_4$, a magnetic layer $Tb_{18}Fe_{78}Co_4$, a magnetic layer $Gd_{18}Dy_6Fe_{60}Co_{16}$ and a protective layer $Si_3N_4$ were formed in this sequence by sputtering. The forming conditions, thicknesses and magnetic characteristics of the respective layers are show in Table 1 and Table 2.

TABLE 1

| Layer | Target Used | Film Forming Condition | |
|---|---|---|---|
| | | Sputtering Pressure (Pa) | Sputtering Rate (Å/sec) |
| $Si_3N_4$ | $Si_3N_4$ | Argon $2 \times 10^{-1}$ | 0.3 |
| $Tb_{18}Fe_{78}Co_4$ | $Tb_{18}Fe_{78}Co_4$ alloy | the same as above | 1.5 |
| $Gd_{18}Dy_6Fe_{60}Co_{16}$ | $Gd_{18}Dy_6Fe_{60}Co_{16}$ alloy | the same as above | 1.5 |

TABLE 2

| Material | Thickness (Å) | Coercive Force (Oe) | Curie point (°C.) | Remarks |
|---|---|---|---|---|
| $Si_3N_4$ | 700 | — | — | |
| $Tb_{18}Fe_{78}Co_4$ | 150 | 15000 | 150 | Preferential magnetization of sub-lattice of Fe atom |
| $Gd_{18}Dy_6Fe_{60}Co_{16}$ | 800 | 400 | 280 | Compensation temperature 160° C. Preferential magnetization of sub-lattice of Gd, Dy atoms |
| $Si_3N_4$ | 700 | — | — | |

Some of the samples prepared were measured by a VSM (sample signal type magnetization measurement instrument) for reversal magnetic fields of the respective magnetic layers.

At a room temperature, the reversal of magnetization of the second magnetic layer $Gd_{18}Dy_6Fe_{60}Co_{16}$ takes place at a small applied magnetic field. A biasing magnetic field due to an exchange force is determined by the reversal magnetic fields in both directions. Then, the sample temperature was raised and a similar measurement was made. In the vicinity of the Curie point of the first magnetic layer $Tb_{18}Fe_{78}Co_4$ the reversal of magnetization of the first magnetic layer $Tb_{18}Fe_{78}Co_4$ takes place at a lower applied magnetic field and a biasing magnetic field due to the exchange force a determined. The results are shown in FIG. 4.

In FIG. 4, solid lines show the coercive forces of the magnetic layers, and broken lines show the biasing magnetic fields due to the exchange forces, which act on the respective layers.

In the first magnetic layer $Tb_{18}Fe_{78}Co_4$ a difference between the biasing magnetic field due to the exchange force and the coercive force reaches a recording margin at a recording temperature. It is thus seen that $H_{BL}$ should be smaller than the recording margin (for example, 500 Oe), and $H_{BH}$ should be larger than the recording margin (for example, 800 Oe).

The substrate having the layers formed thereon was then bonded to the polycarbonate connecting substrate by hot melt bonding material to prepare a magneto-optical disk.

The magneto-optical disk was loaded on a recording and reproducing apparatus and a laser beam focused to approximately 1µm and having a wavelength of 830 nm was continuously irradiated to the disk while the disk was rotated at a linear velocity of approximately 8 m/sec. The biasing magnetic field at the frequency of 700 KHz was applied with different polarities and magnetic field strengths as shown in Table 3 in accordance with the record signals to attain four records.

TABLE 3

| | First Record | Second Record | Third Record | Fourth Record |
|---|---|---|---|---|
| Biasing Magnetic Field (Oe) | +500 | +800 | −500 | −800 |
| Laser Power (mW) | 4 | 4 | 4 | 4 |

Then, a laser beam of 1mW was irradiated to reproduce the signals. The respective recorded signals were reproduced.

A biasing magnetic field at the frequency of 500 KHz with four different strengths as shown in Table 3 was applied to the recorded area and a laser beam of 4mW was continuously applied simultaneously to record signals for instance, as shown in FIG. 11.

Afterwards, the prerecorded signal components at 700 KHz could not be detected, thus confirming that overwriting occurred.

The reproduced signals of the four recorded states were observed by an oscilloscope. The reproduced signals for the first and third records were of opposite polarity to each other and had a signal amplitude of approximately 350 mV.

The reproduced signals for the second and fourth recorded states are of opposite polarity to each other and had a signal amplitude of approximately 200 mV.

It is thus seen that the four recorded states can be reproduced as four independent signals (that is, tetra-value recording is attained).

Figure 5:
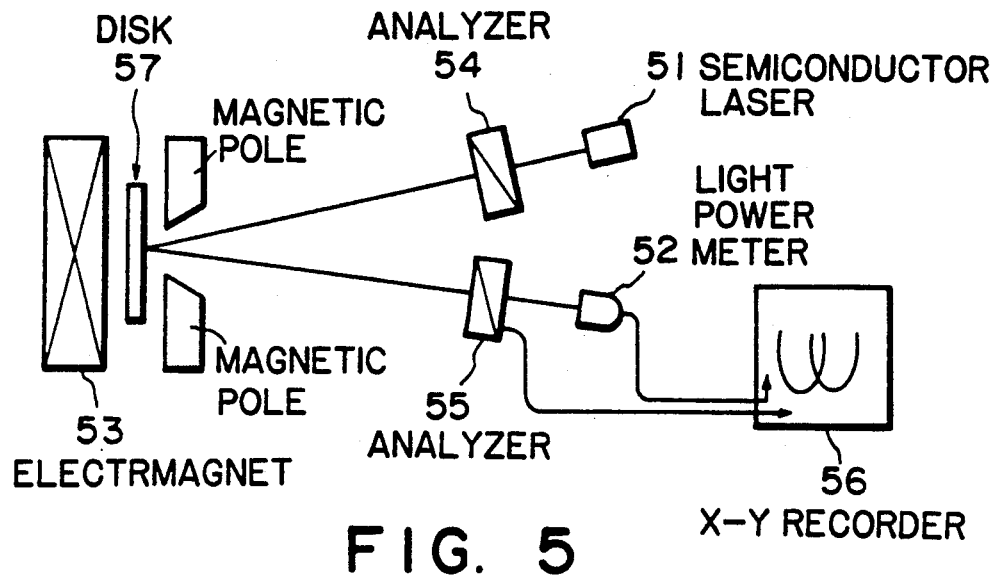
FIG. 5 shows a schematic diagram of a Kerr rotation angle measuring device.

A Kerr rotation angle of the disk in the present example was measured by a device shown in FIG. 5. In FIG. 5, a light from a semiconductor laser 51 passes through an analyzer 54 and directed to a disk 57 held by an electromagnet 53 substantially normally to the disk (inclined approximately 5 degrees) and it is reflected thereby. The reflected light passes through an analyzer 55 and reaches to a light power meter 52. A rotation angle of the analyzer 54 and an output of the light power meter 52 are recorded on an X-Y recorder 56.

The Kerr rotation angles for the first to fourth recorded states are measured in the following manner. For the first record, the first and second magnetic layers of the recording films of the disk are magnetized in one direction by the electromagnet 53. Then, a magnetic field of a magnitude (for example, 2 KOe) which causes the reversal of magnetization in only the second magnetic layer is applied in the opposite direction.

Then, the analyzer 54 is rotated to determine a minimum output point of the light power meter 52.

For the second record, both magnetic layers are magnetized in the same direction as that for the first record. For the third record, both magnetic layers are magnetized in the opposite direction to that for the first record and then the magnetization of the second magnetic layer is reversed. For the fourth record, both magnetic layers are magnetized in the opposite direction to that for the second record.

The minimum points (extinguishing positions) of the light power meter for the respective records were determined. The record states of the first and second records are symmetric to the record states of the third and fourth records, and the rotation angles for the first, second, third and fourth records were +0.30 degree, +0.20 degree, −0.30 degree and −0.20 degree, respectively. (The signs + and − were used for convenience. The extinguishing position on an aluminum reflection film is defined as 0 degree.)

In the above example, the exchange force to make the magnetizations anti-parallel acts between the first and second magnetic layers. The tetra-value recording may also be attained when the exchange force acts to make the magnetizations parallel. In this case, it is necessary that the first magnetic layer has a compensation temperature between a room temperature and the Curie point $T_L$ as shown by the temperature dependency curve of the coercive force of FIG. 6. Where the first and second magnetic layers are made of rare earth-transition metal alloy, those magnetic layers are made of a material which exhibits preferential magnetization of rare earth sub-lattice (riched in rare earth) or a material which exhibit preferential magnetization of transition metal sub-lattice (riched in transition metal).

Figure 6:
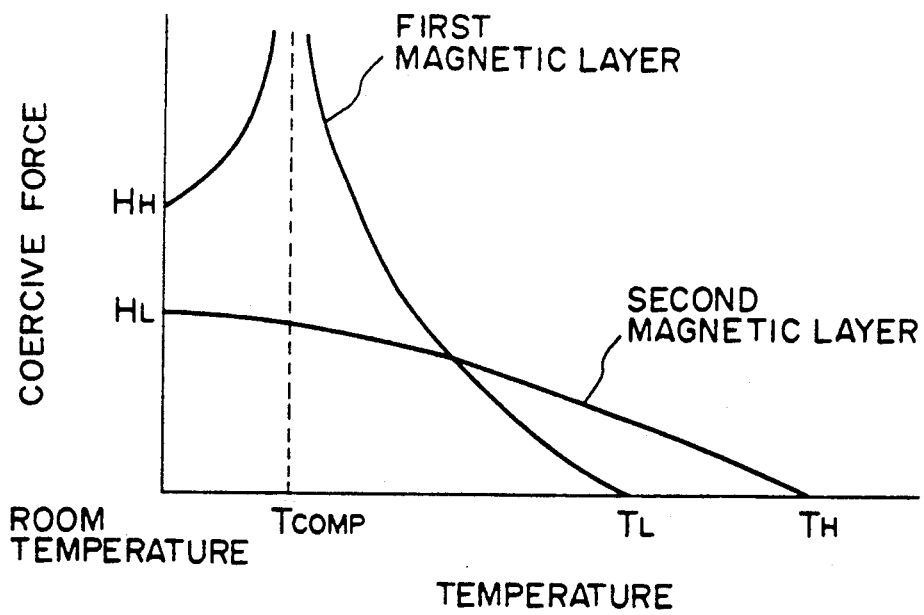
FIG. 6 shows a graph of a temperature characteristic of a coercive force in other medium used in the present method.
Figure 7:
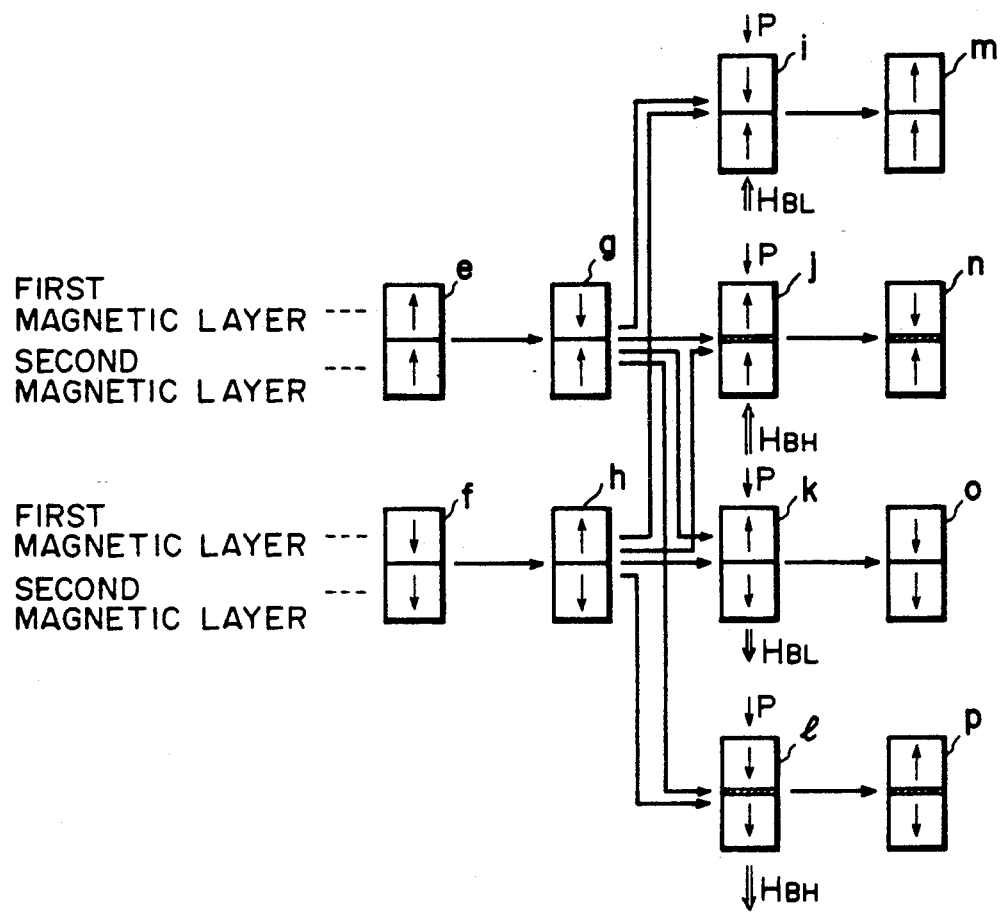
FIG. 7 shows a recording process when the medium of FIG. 6 is used.

A recording process for the recording medium shown in FIG. 6 is illustrated in FIG. 7. The magnetization state prior to the recording may be either upward in both magnetic layers as shown by e or downward in both magnetic layers as shown by f. When the laser beam having the power P is irradiated to the recording medium having such magnetic layers, the temperature of the magnetic layers rises. When the temperature exceeds the compensation temperature $T_{COMP}$ of the first magnetic layer, the magnetization of the first magnetic layer is reversed and the magnetization state g or h is attained. When the temperature is at the vicinity of the Curie point of the first magnetic layer and the magnetization of the first magnetic layer almost disappears, the biasing magnetic field $H_{BL}$ is externally applied upward, orienting the magnetization of the second magnetic layer upwards. When the light beam is moved away from the heated area and the temperature of that areas of the magnetic layers falls, the magnetization in the first magnetic layer shown by i due to the exchange, force, from the second magnetic layer is required when the temperature further falls below the compensation temperature $T_{COMP}$, and magnetic domains shown by m are formed.

When the biasing magnetic field $H_{BH}$ which is larger than the exchange force from the second magnetic layer is applied upward while the light beam having the power P is irradiated, both magnetic layers are oriented upwards as shown by j, when the temperature falls to the room temperature, the magnetization of the first magnetic layer is reversed to assume the state n.

When the biasing magnetic field is applied in the opposite direction, the directions of magnetizations are opposite to those described above. When the downward biasing magnetic field $H_{BL}$ which is smaller than the exchange force is applied, the second magnetic layer is oriented downward and the first magnetic layer is oriented upward by the exchange force as shown by k. At the room temperature, both magnetic layers are magnetized downward as shown by o. On the other hand, when the downward biasing magnetic field $H_{BH}$ which is larger than the exchange force is applied, both magnetic layers are oriented downward as shown by l, and assumes the state P at the room temperature.

As described above, in the case that a medium, which is stable when the magnetizations of both magnetic layers are parallel, is used, the tetra-value recording of the present invention is attained. In the process shown in FIG. 7, it is apparent that the tetra-value recording is attained in the same process even when the state prior to the recording is n or P. Thus, the present method permits the overwriting of the tetra-value signals.

Figure 8:
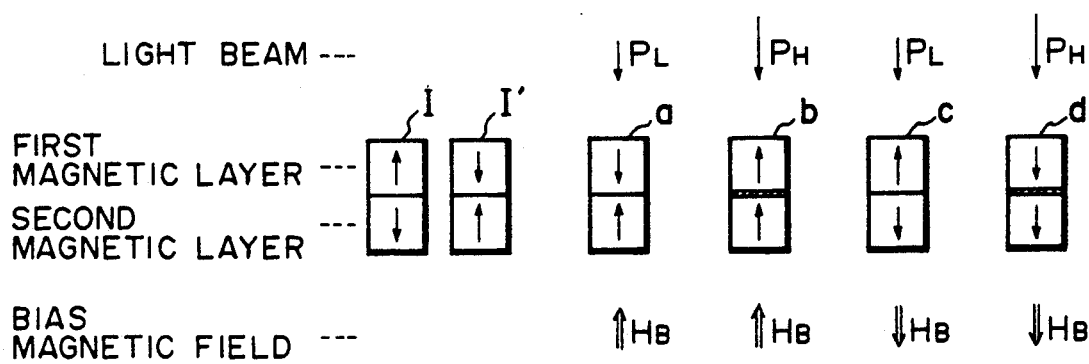
FIG. 8 shows other embodiment of the recording method of the present invention.

FIG. 8 illustrates other embodiment of the recording method of the present invention. In FIG. 8, a rectangular frame shows the first magnetic layer in its upper line and the second magnetic layer in its lower line. Arrows in the frame show directions of magnetizations of the magnetic layers in the respective record states. Arrows below the frames show the polarities of the biasing magnetic fields applied to the medium. Arrows above the frames show the powers of light beams irradiated to the medium. The present embodiment uses a medium in which the exchange force orients the magnetizations anti-parallelly. In the present embodiment, the same recording medium as that used in the previous embodiment may be used.

Figure 9:
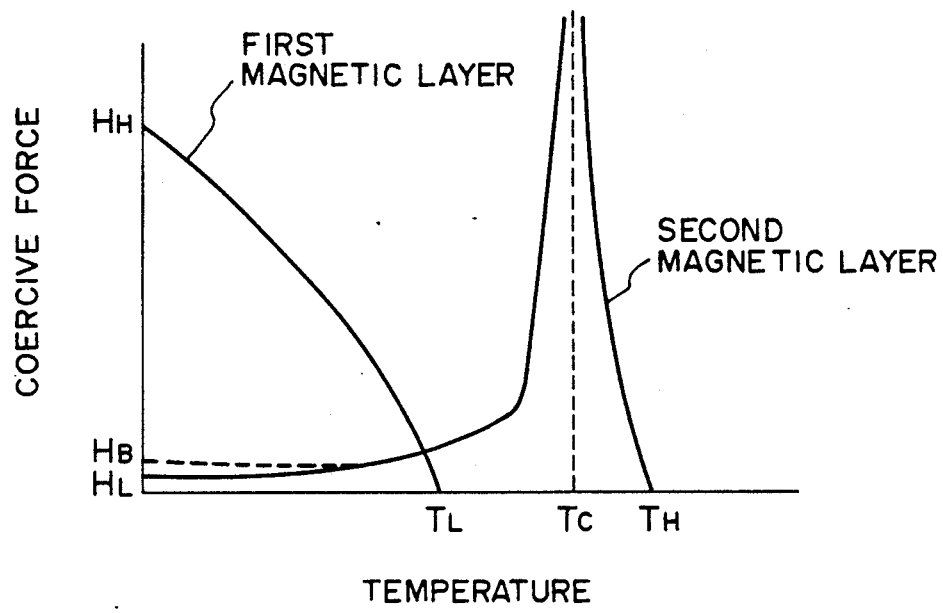
FIG. 9 shows a graph of a temperature characteristic of a coercive force of the magnetic layer used in the method of FIG. 8.

In the present embodiment, the recording/reproducing head 31 irradiates to a disk plane a laser beam which is power-modulated in one of two levels (first level and second level) depending on a signal from the signal source 32 shown in FIG. 2. The laser power $P_L$ of the first level is large enough to heat the disk to the vicinity of the Curie point of the first magnetic layer 2, and the laser power $P_H$ of the second level is large enough to heat the disk to the vicinity of the Curie point of the second magnetic layer 3. In FIG. 9 which shows a relationship between the coercive forces of the magnetic layers 2 and 3 and the temperature, the laser power $P_L$ of the first level can heat the disk up to the vicinity of $T_L$ and the laser power $P_H$ of the second level can heat the disk up to the vicinity of $T_H$.

A biasing magnetic field $H_B$ which is large enough to orient only the second magnetic layer 3 at the room temperature is applied to the irradiation position by the laser beam while the polarity is switched in accordance with the signal from the record signal source 32. The biasing magnetic field $H_B$ is normally in the order of 50–1000 Oe. By the combination of the laser power and the direction of the biasing magnetic field $H_B$, one of the following four records is attained.

In FIG. 8, the state prior to the recording may be either I or I'. When the laser power $P_L$ of the first level is applied while the biasing magnetic field $H_B$ is applied upward (plus). As shown by a, the first magnetic layer 2 is heated to the vicinity of its Curie point but the second magnetic layer 3 has a coercive force to allow the bits to remain stably at this temperature, and the magnetization is oriented upward by the biasing magnetic field. In the first level recording, a force (exchange force) to orient the magnetization of the first magnetic layer 2 along the direction which is stable to the magnetization of the second magnetic layer 3 (that is, anti-parallel) is generated. In this manner, the bits shown in a are formed in any of the states I and I'.

In FIG. 8, the laser power $P_H$ of the second level is then applied while the biasing magnetic field $H_B$ is applied upward as shown by b to heat the disk up to the vicinity of the Curie, point of the second magnetic layer 3.

When the temperature rises above the compensation temperature $T_C$ shown in FIG. 9, the magnetization of the second magnetic layer 3 is reversed. (That is, in FIG. 8, it changes from upward ( ↑ ) to downward ( ↓ )). When the temperature of the disk further rises to the vicinity of the Curie point $T_H$ of the second magnetic layer 3, the magnetization of the second magnetic layer 3 is oriented along the direction of the biasing magnetic field $H_B$, that is, upward ( ↑ ). Then, when the record bits move away from the focusing point of the laser beam and the temperature of the bit area falls below the compensation temperature $T_C$ shown in FIG. 9, the magnetization of the second magnetic layer changes from upward ( ↑ ) to downward ( ↓ ). When the temperature of the bit area falls below the Curie point $T_L$ of the first magnetic layer, the magnetization appears in the first magnetic layer in the direction which is stable to the magnetization of the second magnetic layer 3, that is, upward ( ↑ ). When the temperature of the bit area approaches the room temperature, the coercive force of the second magnetic layer becomes smaller than the biasing magnetic field $H_B$ and the magnetization of the second magnetic layer is reversed (from downward ( ↓ ) to upward ( ↑ ).

In this manner, the bits shown by $\underline{b}$ can be formed in any of the states I and I'.

In FIG. 8, when the laser power $P_L$ of the first level is irradiated while the biasing magnetic field $H_B$ is applied downward (minus), the bits shown by $\underline{c}$ are formed in any of the states I and I'.

In FIG. 8, when the laser power $P_H$ of the second level is applied while the biasing magnetic field $H_B$ is applied downward, the bits shown by $\underline{d}$ are formed in any of the states I and I'.

Since the states $\underline{a}$, $\underline{b}$, and $\underline{d}$ of the recorded bits are controlled by the direction of the biasing magnetic field $H_B$ and the power of the laser in the recording mode and do not depend on the state prior to the recording, the overwriting is attained.

EXAMPLE 2

The magneto-optical disk prepared in the same manner as the Example 1 was loaded on the recording and reproducing apparatus, and the laser beam focused to approximately 1 μm and having the wavelength of 830 nm and the biasing magnetic field $H_B$ modulated at the frequency of 1MHz were applied while the disk was rotated at the linear velocity of approximately 8 m/sec. The biasing magnetic field $H_B$ and the laser power were combined in four ways to make four records as shown in Table 4 using recording signals as shown in FIG. 12.

TABLE 4

|  | First Record | Second Record | Third Record | Fourth Record |
|---|---|---|---|---|
| Biasing Magnetic Field (Oe) | +500 | +500 | −500 | −500 |
| Laser Power (mW) | 4 | 4 | 4 | 4 |

Then, a laser beam of 1mW was irradiated to reproduce the signals. The respective record signals were reproduced.

Similar records were formed at the frequency of 0.75 MHz in the above record area.

As a result, the prerecorded 1 MHz signal component was not detected and only the 0.75 MHz signal component was detected. It was thus confirmed that the overwriting was attained.

The reproduced signals of the four records were observed by an oscilloscope. The reproduced signals for the first and third records were of opposite polarity to each other and had a signal amplitude of approximately 400 mV.

The reproduced signals for the second and fourth records were of opposite polarity to each other and had a signal amplitude of approximately 250 mV.

It is seen from the above results that the four records can be reproduced as four independent signals (that is, tetra-value recording is attained).

The Kerr rotation angles of the disk in the present example were measured by the device shown in FIG. 5 in the same manner as the Example 1. The record states of the first and second records were symmetric to the record states of the third and fourth records, and the rotation angles of the first, second, third and fourth records were +0.32 degree, +0.20 degree, −0.32 degree and −0.20 degree, respectively.

In the method shown in FIG. 8, the recording medium in which the exchange force acts to make the magnetizations parallel between the magnetic layers may be used. In the case, the temperature characteristics of the coercive forces of the respective magnetic layers may be either those shown in FIG. 6 or those shown in FIG. 9.

Figure 10:
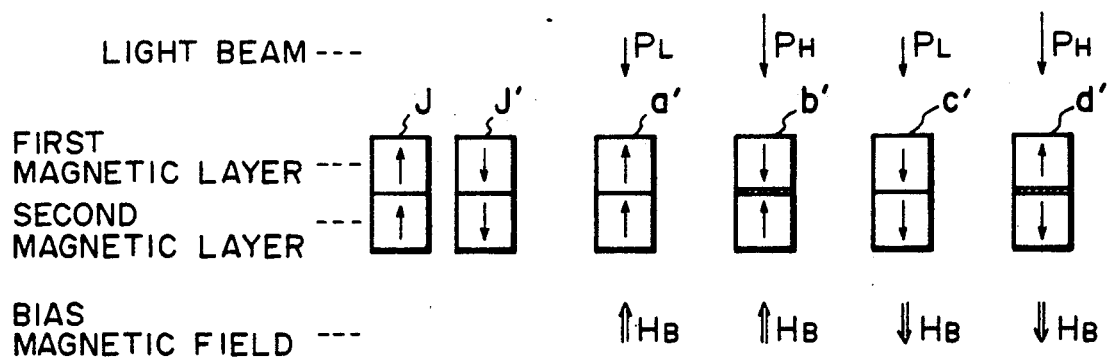
FIG. 10 shows a recording process when a medium in which exchange forces act parallelly is used in the recording method of FIG. 8.

FIG. 10 illustrates a recording process when the exchange force to make the magnetizations parallel acts between the magnetic layers and the magnetic layers have the characteristics shown in FIG. 9. The powers $P_H$ and $P_L$ and the magnetic field $H_B$ are of the same magnitudes as those in FIG. 8. The magnetization prior to the recording may be either J or J'. When the biasing magnetic field $H_B$ is applied upward to the medium, the magnetization of the second magnetic layer is upward. When the light beam having the power $P_L$ is irradiated, the magnetization of the first magnetic layer disappears, when the light beam moves away and the temperature of that area falls, the exchange force from the second magnetic layer acts on the first magnetic layer and the upward magnetization appears. Thus, the bits shown by $\underline{a'}$ are formed.

When the light beam having the power $P_H$ is irradiated to the medium, the magnetizations of both magnetic layers disappear. If the biasing magnetic field $H_B$ is applied upward, the upward magnetization appears in the second magnetic layer after the light beam has moved away. When the temperature of the medium falls below the compensation temperature $T_C$, the magnetization of the second magnetic layer is reversed. When the temperature of the medium falls below $T_L$, the downward magnetization appears in the first magnetic layer by the exchange force from the second magnetic layer. When the temperature of the medium further falls to the room temperature, the magnetization of the second magnetic layer is oriented upward by the biasing magnetic field. In this manner, the bits shown by $\underline{b'}$ are formed in any of the states J and J'.

When the light beam having the power $P_L$ is irradiated while the biasing magnetic field $H_B$ is applied downward, the same process as that for $\underline{a'}$ with the opposite polarity is carried out and the bits shown by $\underline{c}$ are formed. When the light beam having the power $P_H$ is irradiated while the biasing magnetic field $H_B$ is applied downward, the same process as that for $\underline{b'}$ with the opposite polarity is carried out and the bits shown by $\underline{d'}$ are formed.

As described above, where the magnetizations of the magnetic layers are parallel and stable, the tetra-value recording is attained by the method of the second embodiment. In the processes shown in FIG. 8 and FIG. 10, it is apparent that the tetra-value recording is attained in the same process even if the state prior to the recording is b, d, b' or d'. Thus, the present method attains the overwriting of the tetra-value signal.

The present invention may be applicable in various ways other than the embodiments described herein. The present invention covers all those modifications without departing from the scope of the appended claims.

What is claimed is:

1. A method for recording a signal on a magneto-optical recording medium comprising a first magnetic layer exhibiting a vertical magnetic anisotropy and a second magnetic layer exchange-coupled to the first magnetic layer and having a higher Curie point and a lower coercive force at a room temperature than those of the first magnetic layer, exchange forces acting on the first and second magnetic layers being lower than the coercive force of the second magnetic layer, said method comprising the steps of:

irradiating a light beam having a power to heat the medium to the vicinity of the Curie point of the first magnetic layer;

applying to the medium a biasing magnetic field having polarity and magnitude thereof modulated in the following four states depending on the signal during said irradiating of said light beam;

(a) a first state wherein the biasing magnetic field orients the magnetization of the second magnetic layer along a predetermined direction and orients the magnetization of the first magnetic layer along a direction opposed to said predetermined direction according to the exchange force of the second magnetic layer, (b) a second state wherein the biasing magnetic field orients the magnetizations of both the first magnetic layer and the second magnetic layer along the predetermined direction, (c) a third state wherein the biasing magnetic field orients the magnetization of the second magnetic layer along the opposite direction to the predetermined direction and orients the magnetization of the first magnetic layer along said predetermined direction according to the exchange force of the second magnetic layer, and (d) a fourth state wherein the biasing magnetic field orients the magnetizations of both the first magnetic layer and the second magnetic layer along the opposite direction to the predetermined direction.

2. A method for recording a signal on a magneto-optical recording medium according to claim 1 wherein said second magnetic layer has a higher compensation temperature than the Curie point of said first magnetic layer.

3. A method for recording a signal on a magneto-optical recording medium according to claim 1 wherein said first magnetic layer has a compensation temperature between a room temperature and the Curie point thereof.

4. A method for recording a tetra-value information signal onto a magneto-optical recording medium comprising a first magnetic layer exhibiting a vertical magnetic anisotropy and a second magnetic layer exchange-coupled to the first magnetic layer, having a vertical magnetic anisotropy and a higher Curie point and a lower coercive force at room temperature than that of the first magnetic layer, wherein exchange forces acting on the first and second magnetic layers is lower than the coercive force of the second magnetic layer, comprising the steps of:

modulating both a light beam into high and low power levels and a magnetic biasing field into high and low magnetic polarities in accordance with the information signal to be recorded to the medium;

applying the magnetic biasing field while irradiating the light beam to the medium to record information thereon, so that:

(a) when the light beam is in a first state with a low power level for heating the medium to the vicinity of the Curie point of the first magnetic layer, the magnetic biasing field is in the first state with a predetermined magnetic polarity;

(b) when the light beam is in the second state with a high power level for heating the medium to the vicinity of the Curie point of the second magnetic layer, the magnetic biasing field is in the first state with said predetermined magnetic polarity;

(c) when the light beam is in the first state with said low power level for heating the medium to the vicinity of the Curie point of the first magnetic layer, the magnetic biasing field is in the second state with a magnetic polarity opposite to the predetermined magnetic polarity;

(d) when the light beam is in the second state with said high power level for heating said medium to the vicinity of the Curie point of the second magnetic layer, the magnetic biasing field is in the second state with said opposite magnetic polarity.

5. A method for recording a signal on a magneto-optical recording medium according to claim 4 wherein said biasing magnetic field is large enough to orient the magnetization of only said second magnetic layer along the direction of said applied magnetic bias field at a room temperature.

6. A method for recording a signal on a magneto-optical recording medium according to claim 4 wherein said second magnetic layer has a higher compensation temperature than the Curie point of said first magnetic layer.

7. A method according to claim 1, further comprising a step for cooling the medium temperature down to the room temperature at which the magnetizations of the first and second magnetic layers in a portion where the magnetic field has been applied with the first state are both oriented in the predetermined direction, the magnetization of the second magnetic layer and the magnetization of the first magnetic layer in a portion where the magnetic field has been applied with the second state are oriented in the predetermined direction and the direction opposed to the predetermined direction, respectively, the magnetizations of the first and second magnetic layers in a portion where the magnetic field has been applied with the third state are both oriented in the direction opposed to the predetermined direction, and the magnetization of the second magnetic layer and the magnetization of the first magnetic layer in a portion where the magnetic field has been applied with the fourth state are oriented in the direction opposed to the predetermined direction and in the predetermined direction, respectively.

* * * * *

UNITED STATES PATENT AND TRADEMARK OFFICE
CERTIFICATE OF CORRECTION

PATENT NO.  : 5,163,031
DATED       : November 10, 1992
INVENTOR(S) : OSATO

It is certified that error appears in the above-identified patent and that said Letters Patent is hereby corrected as shown below:

In the Drawings, Sheet 3
    Figure 5, "ELECTRMAGNET" should read --ELECTROMAGNET--.

COLUMN 1

Line 18, "magneto-optical" should be deleted.

Line 38, "U.S." should be deleted.

Line 43, "On information other hand, recording density and the" should read --On the other hand, recording density and recording--.

Line 52, "density," should read --density--.

Line 54, "is distant" should be deleted.

Line 56, "of" should read --of the--.

Line 67, "However," should read --However, in--.

COLUMN 2

Line 19, "then" should read --than--.

Line 52, "other" should read --another--.

UNITED STATES PATENT AND TRADEMARK OFFICE
CERTIFICATE OF CORRECTION

PATENT NO. : 5,163,031

DATED : November 10, 1992

INVENTOR(S) : OSATO

It is certified that error appears in the above-identified patent and that said Letters Patent is hereby corrected as shown below:

COLUMN 3

Line 28, "a temperature characteristic" should read --the temperature characteristics--.

Line 29, "a coercive force of a magnetic layer" should read --respective coercive forces of the magnetic layers--.

Line 33, "a temperature characteristic" should read --the temperature characteristics--.

Line 34, "a coercive force in other" should read --respective coercive forces of the magnetic layers in another embodiment of the--.

Line 38, "other" should read --another--.

Line 40, "a temperature characteristic" should read --the temperature characteristics--.

Line 41, "a coercive force" should read --the respective coercive forces" and "layer" should read --layers--.

Line 60, "($H_L$)" should read --($H_L$).-- and "herein used" should read --used herein--.

Line 66, "koe." should read --KOe.--

UNITED STATES PATENT AND TRADEMARK OFFICE
CERTIFICATE OF CORRECTION

PATENT NO. : 5,163,031
DATED : November 10, 1992
INVENTOR(S) : OSATO

It is certified that error appears in the above-identified patent and that said Letters Patent is hereby corrected as shown below:

COLUMN 4

Line 16, "Ms2" should read --$Ms_2$--.

Line 17, "h2" should read --$h_2$--.

Line 28, "stably" should read --stable--.

COLUMN 5

Line 15, "is" should read --in--.

Line 45, "is" should read --is the--.

Line 57, "the," should read --the--.

COLUMN 6

Line 9, after "assures" insert --that-- and "stably" should read --stable--.

Line 17, "present" should read --prevent--.

Line 24, "presents" should read --prevents--.

Line 37, "bits" should read --bits $c$--.

Line 67, "show" should read --shown--.

COLUMN 7

Line 44, "a" should read --is--.

UNITED STATES PATENT AND TRADEMARK OFFICE
CERTIFICATE OF CORRECTION

PATENT NO. : 5,163,031
DATED : November 10, 1992
INVENTOR(S) : OSATO

It is certified that error appears in the above-identified patent and that said Letters Patent is hereby corrected as shown below:

COLUMN 8

Line 28, "are" should read --were--.

COLUMN 9

Line 16, "riched" should read --rich--.

Line 17, "exhibit" should read --exhibits--.

Line 18, "riched" should read --rich--.

Line 30, "$\underline{h}$is" should read --$\underline{h}$ is--.

Line 37, "areas" should read --area--.

Line 38, "shown by $\underline{i}$ due to the exchange," should read --is as shown in $\underline{i}$ due to the exchange--.

Line 39, "force," should read --force-- and "layer is required when" should read --layer. When--.

Line 41, "and" should read --the--.

Line 42, No paragraph break.

Line 43, No paragraph break.

Line 47, "by $\underline{j}$, when" should read --by $\underline{j}$. When--.

Line 49, No paragraph break.

Line 50, No paragraph break.

UNITED STATES PATENT AND TRADEMARK OFFICE
CERTIFICATE OF CORRECTION

PATENT NO. : 5,163,031
DATED : November 10, 1992
INVENTOR(S) : OSATO

It is certified that error appears in the above-identified patent and that said Letters Patent is hereby corrected as shown below:

COLUMN 10

Line 1, "P" should read --$\underline{p}$--.

Line 3, "other" should read --another--.

Line 37, "HB" should read --$H_B$--.

COLUMN 11

Line 15, "(†)." should read --(†))--.

Line 20, "$\underline{c}$are" should read --$\underline{c}$ are--.

Table 4, "Laser Power
(mW)       4      4      4      4" should read
--Laser Power
(mW)       4      8      4      8--.

COLUMN 12

Line 18, "the" should read --this--.

Line 32, "disappears," should read --disappears.--.

Line 33, "when" should read --When--.

UNITED STATES PATENT AND TRADEMARK OFFICE
CERTIFICATE OF CORRECTION

PATENT NO. : 5,163,031

DATED : November 10, 1992

INVENTOR(S) : OSATO

Page 6 of 6

It is certified that error appears in the above-identified patent and that said Letters Patent is hereby corrected as shown below:

COLUMN 13

Line 66, "is" should read --are--.

COLUMN 14

Line 26, "polarity;" should read --polarity; and--.

Signed and Sealed this

Tenth Day of May, 1994

Attest:

BRUCE LEHMAN

Attesting Officer

Commissioner of Patents and Trademarks